US010101863B2

United States Patent
(12) United States Patent
Vandermeijden et al.

(10) Patent No.: US 10,101,863 B2
(45) Date of Patent: Oct. 16, 2018

(54) FORCE CALIBRATION FOR TEMPERATURE

(71) Applicant: Synaptics Incorporated, San Jose, CA (US)

(72) Inventors: Tom R. Vandermeijden, Los Gatos, CA (US); Divya Laguduvan, San Jose, CA (US); Umha Mahesh Srinivasan, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 118 days.

(21) Appl. No.: 15/382,384

(22) Filed: Dec. 16, 2016

(65) Prior Publication Data

US 2017/0242505 A1 Aug. 24, 2017

Related U.S. Application Data

(60) Provisional application No. 62/297,116, filed on Feb. 18, 2016.

(51) Int. Cl.

| | |
|---|---|
| ***G06F 3/041*** | (2006.01) |
| ***G06F 3/044*** | (2006.01) |
| ***G01K 3/14*** | (2006.01) |
| ***G01K 7/34*** | (2006.01) |

(52) U.S. Cl.

CPC ............... *G06F 3/044* (2013.01); *G01K 3/14* (2013.01); *G01K 7/34* (2013.01); *G06F 3/0414* (2013.01); *G06F 3/0418* (2013.01); *G01K 2217/00* (2013.01); *G06F 3/0412* (2013.01); *G06F 2203/04105* (2013.01)

(58) Field of Classification Search

CPC .................. G06F 3/044; G06F 3/0414; G06F 2203/04105; G06F 2203/04106; G06F 2203/04104; G06F 3/041; G06F 3/03547; G06F 1/1626; G06F 1/3231; G06F 3/0416; G06F 3/016; G06F 17/18; G06F 17/3086

USPC ................................................ 345/173–175

See application file for complete search history.

(56) References Cited

U.S. PATENT DOCUMENTS 8,768,530 B2 * 7/2014 Liang ................ G05D 23/1932 318/471
9,933,888 B2 * 4/2018 Kim ...................... G06F 3/0416
2016/0048266 A1 * 2/2016 Smith .................. G06F 3/0418 345/174
2016/0231860 A1 8/2016 Elia

* cited by examiner

*Primary Examiner* — Duc Q Dinh
(74) *Attorney, Agent, or Firm* — Ferguson Braswell Fraser Kubasta PC

(57) ABSTRACT

A processing system includes sensor circuitry and processing circuitry. The sensor circuitry is configured to be coupled to force sensor electrodes, and is configured to drive the force sensor electrodes to obtain capacitive measurements. The processing circuitry is operatively connected to the sensor circuitry and configured to aggregate the capacitive measurements into an aggregated measurement, and apply, to the aggregated measurement, a capacitive measurement to temperature mapping to obtain a current temperature of the force sensor electrodes.

20 Claims, 6 Drawing Sheets

FORCE CALIBRATION FOR TEMPERATURE

CROSS REFERENCE TO RELATED APPLICATIONS

This application claims priority under 35 U.S.C. § 119(e) to U.S. Provisional Patent Application Ser. No. 62/297,116, filed on Feb. 18, 2016 and entitled, "FORCE AUTOCALIBRATION FOR TEMPERATURE OVER STRESS", which is incorporated herein by reference in its entirety.

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, one or more embodiments relate to a processing system. The processing system includes sensor circuitry and processing circuitry. The sensor circuitry is configured to be coupled to force sensor electrodes, and is configured to drive the force sensor electrodes to obtain capacitive measurements. The processing circuitry is operatively connected to the sensor circuitry and configured to aggregate the capacitive measurements into an aggregated measurement, and apply, to the aggregated measurement, a capacitive measurement to temperature mapping to obtain a current temperature of the force sensor electrodes.

In general, in one aspect, one or more embodiments relate to a method. The method includes driving force sensor electrodes to obtain capacitive measurements, aggregating the capacitive measurements into an aggregated measurement, and applying, to the aggregated measurement, a capacitive measurement to temperature mapping to obtain a current temperature of the force sensor electrodes.

In general, in one aspect, one or more embodiments relate to an input device. The input device includes sensor electrodes configured to generate sensing signals, and a processing system connected to the sensor electrodes. The processing system is configured to drive the force sensor electrodes to obtain capacitive measurements. The processing system is further configured to aggregate the capacitive measurements into an aggregated measurement, and apply, to the aggregated measurement, a capacitive measurement to temperature mapping to obtain a current temperature of the force sensor electrodes.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements, and.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. In particular, one or more embodiments are directed to measuring temperature using capacitive force sensor electrodes of an input device. The capacitive force sensor electrodes are physical sensor electrodes arrange to detect force on an input surface. One or more embodiments use the measurements of the force sensor electrodes when an input object is not present in the sensing region to determine the temperature of the input device. Based on the temperature, when an input object is present, the measurements of the force sensor electrodes may be revised to account for the variation due to temperature.

Figure 1:
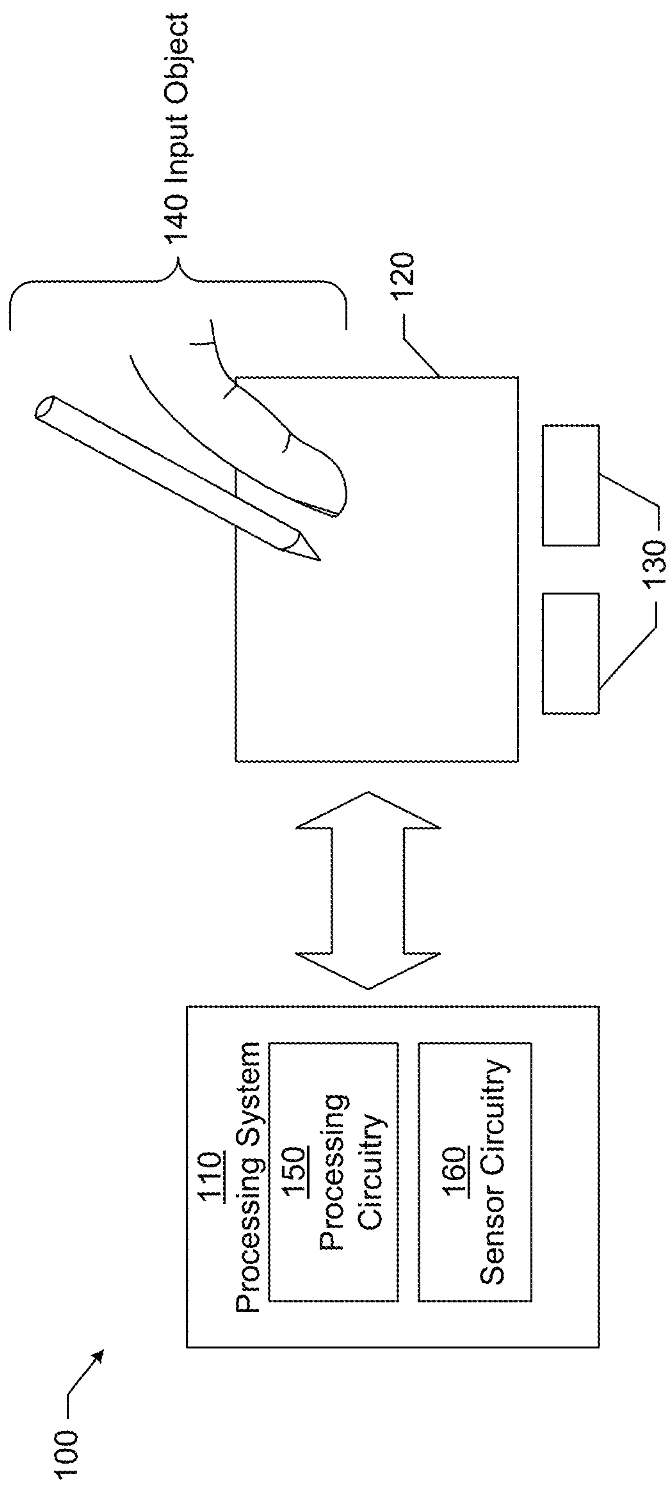
FIGS. 1, 2, and 3 show block diagrams of example systems in accordance with one or more embodiments of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
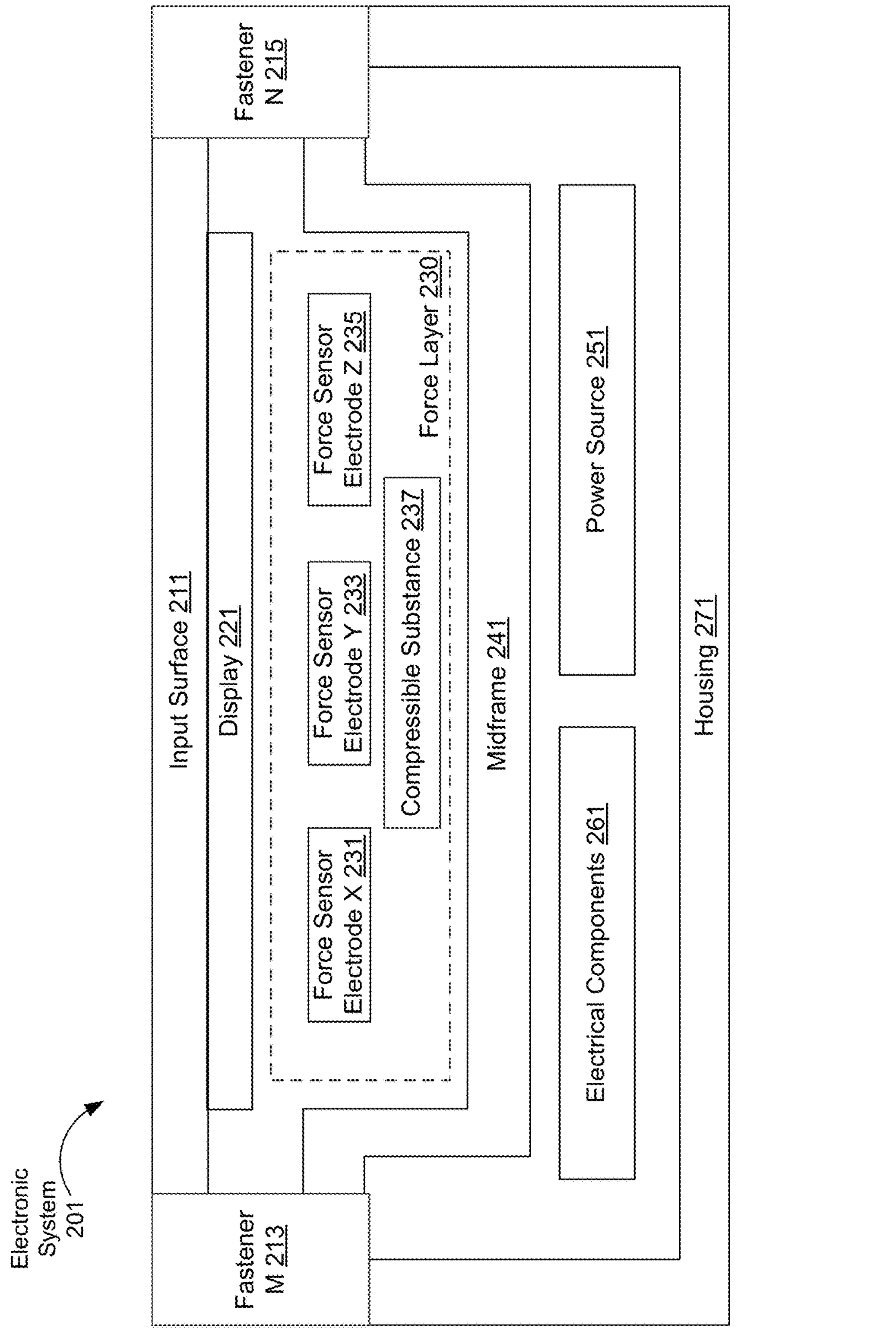

Turning to FIG. 2, FIG. 2 shows an example cross sectional diagram of an electronic system (201) in accordance with one or more embodiments. The electronic system (201) may be a smart phone, a tablet computing device, a touchscreen, a computing device with a touchpad, or other device. As shown in FIG. 2, an electronic system (201) may include an input surface (211), display (221), a force layer having force sensor electrodes (e.g., force sensor X (231), force sensor electrode Y (233), force sensor electrode Z (235)), and a compressible layer (237), a midframe (241), a power source (251), electrical components (261), and housing (271). Each of these components is described below.

The housing (271) may be metal, plastic, other material, or a combination of materials. The housing (271) may be referred to as the frame of the electronic system (201) and may hold the input device.

The input device may include the input surface (211), display (221), and the compressible layer (237) as well as various components described above with reference to FIG. 1. The input surface (211) is the surface of the input device that may be touched by an input object. For example, the input surface (211) may be glass or other material. The display (221) is a physical device that is configured to present visual information to a user. For example, the display (221) may be any type of light emitting diode (LED), organic LED (OLED), liquid crystal display (LCD), plasma, electroluminescence (EL), or other display technology. The input surface (211) and display (221) have bending properties that define the amount of bending by the input surface (211) and display (221) in response to force at various positions along the input surface. In other words, the bending properties of the input surface (211) and display (221) refer to the amount of bend (i.e., deflection) of the input surface (211) and display (221) when subjected to an external force onto the input surface (211) and display (221). The input surface (211) and display (221) may be treated as having single bending properties or individual bending properties. Although FIG. 2 shows a distinct input surface (211) and display (221), the input surface may be an uppermost part of the display.

One or more fasteners (e.g., fastener M (213), fastener Y (215)) may connect the input surface (211) and the display (221) to the housing (271) at attachment points. For example, the fastener may be an adhesive (e.g., weld, solder, cement, glue), crimping, a mounting bracket or other hardware connector, or other type of fastener. The attachment points are the points at which the fastener connects the input surface (211) and display (221) to the housing (271). For example, the attachment points may be around the edges of the input surface and/or the display. Other attachment points may exist without departing from the scope of the invention. Amongst other factors, such as punch outs in the midframe (241), the fastener and locations of attachment points may affect the bending properties of the of the input surface (211) and display (221). In other words, the amount of bend may change depending on the type of fastener used and the location of the attachment points.

The electronic system (201) may further include various electrical components (261), and a power source (251). The electrical components (261) may include one or more circuit boards, such as a main board or printed circuit board assembly, that have various integrated circuits attached to the circuit boards. In another example, the electrical components (261) may include a processor, memory, and/or any other electrical devices for operating the electronic system (201).

Furthermore, the power source (251) may be hardware that includes functionality to provide electrical power to the electrical components (261), the force sensor electrodes (e.g., force sensor X (231), force sensor electrode Y (233), force sensor electrode Z (235)), and a processing system (not shown). For example, the power source (251) may be a rechargeable battery with functionality to charge using an electric current obtained from an external power source connected to the electronic system (201).

In one or more embodiments, the electronic system (201) includes a midframe (241) disposed between the display (221) and the housing (271). For example, the midframe (241) may be a conductive material configured as an interior support frame, for example, for the electronic system (201). Moreover, the midframe (241) may be a piece of sheet metal, such as a shielding can. In one or more embodiments, for example, the midframe (241) is a foil or plating layer attached to a non-conductive substrate. The midframe (241) may include various punch outs or cutouts for electrical and/or optical connectors that may affect the bending properties.

The force layer (230) includes force sensor electrodes (e.g., force sensor X (231), force sensor electrode Y (233), force sensor electrode Z (235)) and a compressible substance (237) that are arranged such that capacitive measurements detected using the force sensor electrodes are indicative of the amount of force applied to the input surface. In particular, the force sensor electrodes (e.g., force sensor X (231), force sensor electrode Y (233), force sensor electrode Z (235)) are sensor electrodes, such as the sensor electrodes described above with reference to FIG. 1, that are arranged so as to be electrically affected by a force applied to the input surface. The compressible substance is any non-conductive substance (e.g., optical clear adhesive (OCA), or any other compressible medium) which may be characterized with a bending or compressible stiffness. Thus, measurements acquired using the force sensor electrodes indicate the amount of force applied to the input surface. Various different arrangements of force sensor electrodes may be used without departing from the scope of the invention. The following are a few example arrangements.

In a first example, the force sensor electrodes may be attached or a part of the display and the compressible substance may be interposed between the force sensor electrodes and the midframe. In such a scenario, absolute capacitive sensing may be used. In particular, when force is applied to the input surface, the compressible layer compresses causing the midframe to be closer to the force sensor electrodes. Based on the decrease in distance (i.e., the amount of bend or deflection), the absolute capacitance of a force sensor electrode changes, whereby the amount of change reflects the amount of the decrease and correspondingly the amount of force applied.

In another embodiment of the configuration of FIG. 2, transcapacitive sensing may be used. In such a scenario, a first subset of the force sensor electrodes adjacent to the display may be transmitter electrodes, a second subset of force sensor electrodes adjacent to the display may be receiver electrodes, and the compressible substance may be interposed between the midframe and the force sensor electrodes. The transmitter electrodes may transmit transmission signals and the receiver electrodes may receive resulting signals from the transmission signals. When a force is applied to the input surface, the compressible layer compresses causing the midframe to be closer to the transmitter electrodes and receiver electrodes. The reduction of distance to the midframe changes the resulting signals received by the receiver electrodes as compared to the electronic system without force applied. Thus, the measurements of the resulting signals are affected by the amount of force applied.

By way of another example configuration, a first subset of the force sensor electrodes may be located above the compressible substance and a second subset of the force sensor electrodes may be located below the compressible substance. Further, the midframe may or may not include conductive material. In the example, transcapacitive sensing between the first subset and second subset may be performed as described above to determine the amount of deflection, and correspondingly indicate the amount of force of the first subset to the second subset.

In another example, one or more of the force sensor electrodes (231, 233, 235) may be electrodes of the display (221) used for both display updating and force and/or touch sensing. In other words, some or all of the electrodes used to update the display may be used to perform capacitive sensing. The capacitive sensing may be for force (e.g., based on capacitance being affected by an amount of compression of the compressible layer) and/or for touch (e.g., based on capacitance being affected by a position of an input object in the sensing region) to determine positional information.

The above are only a few examples. Other configurations of the electronic system to perform force sensing may be used without departing from the scope of the invention.

Figure 3:
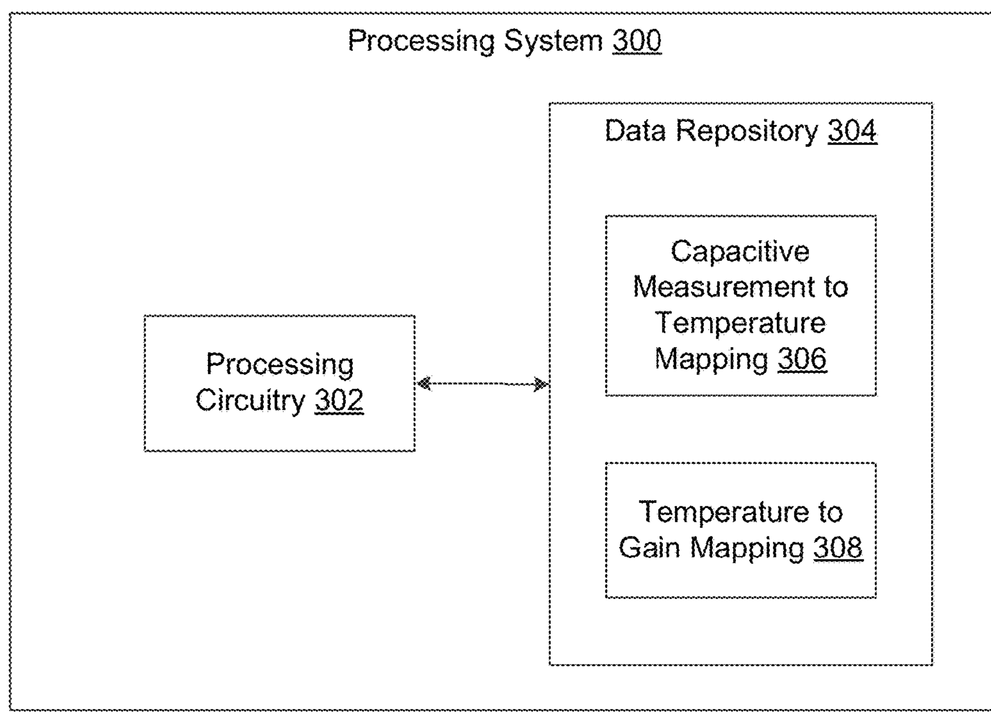

FIG. 3 shows an example block diagram of a processing system (300) in accordance with one or more embodiments of the invention. As shown in FIG. 3, the processing system (300) includes processing circuitry (302) and a data repository (304). The processing circuitry (302) is any hardware circuitry configured to process instructions. For example, the processing circuitry (302) may be an application specific integrated circuit (ASIC), general processing unit, a dedicated core of a central processing unit, or other electronic circuitry.

The data repository (304) is any physical and/or logical storage unit for storing data. For example, the data repository (304) may be physical memory and/or a collection of logical data structures, or other repository for information. The data repository (304) is configured to store a capacitive measurement to temperature mapping (306) and a temperature to gain mapping (308).

The capacitive measurement to temperature mapping (306) relates various capacitive measurements to a corresponding temperature. The capacitive measurements stored in the capacitive measurement to temperature mapping (306) may correspond to raw measurements acquired from the force sensor electrodes. In other embodiments, the capacitive measurements may correspond to raw measurements adjusted for a baseline and/or after other filtering is performed. Further, an individual capacitive measurement to temperature mapping (306) may exist for each force sensor electrode or each subset of the force sensor electrodes. For example, one capacitive measurement to temperature mapping may exist for a first force sensor electrode while another distinct capacitive measurement to temperature mapping exists for a second force sensor electrode. The various capacitive measurement to temperature mappings may be stored in separate data structures or in a combined data structure.

In one or more embodiments, a capacitive measurement to temperature mapping may exist for the combined force sensor electrodes. In such a scenario, the capacitive measurement stored in the capacitive measurement to temperature mapping (306) may be an aggregated measurement. The aggregated measurement is a single value generated by applying an aggregation function to the raw or processed capacitive measurements. The aggregation function may be an average, a weighted average, or another function for aggregating the capacitive measurements.

The temperature in the capacitive measurement to temperature mapping may be in any units of temperature (e.g., kelvin, Celsius, Fahrenheit, or other unit). Further, the temperature may be an absolute temperature (e.g., 30 degrees) or a relative temperature (e.g., the amount of offset from freezing, from room temperature, etc.). For example, the temperature may be a difference between a current temperature and a temperature measured when the capacitive measurement to temperature mapping is generated. For example, if the temperature is 27 degrees Celsius when the capacitive measurement to temperature mapping is generated, then a temperature of 5 calculated from the capacitive measurement to temperature mapping reflects a current temperature of 32 degrees Celsius.

In one or more embodiments, the capacitive measurement to temperature mapping (306) is a logical table. In such a scenario, each capacitive measurement in a set of capacitive measurements is related to a corresponding temperature in the logical table. In one or more embodiments, the capacitive measurement to temperature mapping (306) is a function. The function may be a continuous function, such as a linear function. For example, the function may be of the form $f(t)=m*t+b$, where m is the slope of the linear function, b is the y-intercept (e.g., intercept on the capacitive measurement axis), t is temperature, and f(t) is the capacitive measurement.

Continuing with FIG. 3, the temperature to gain mapping (308) maps the temperature of the force sensor electrodes to the gain to apply to capacitive measurements from the force sensor electrodes. The temperature may be an absolute or relative temperature. Further, the temperature may be the same type as the temperature in the capacitive measurement to temperature mapping (306). For example, if the temperature in the capacitive measurement to temperature mapping (306) is a relative temperature indicating offset from the temperature in which the capacitive measurement to temperature mapping was generated, the temperature in the temperature to gain mapping may be the same relative temperature or may be an absolute temperature. The gain may be an additive gain (e.g., a value to add to a capacitive measurement from a force sensor electrode), a multiplicative gain (e.g., a value that the capacitive measurement from a force sensor electrode are multiplied by) or another form of gain. The temperature to gain mapping may be regardless of position of the input object on the sensing surface or may be specific to a particular position of the input object. For example, a separate temperature to gain mapping may exist for each of various positions of input object on the sensing surface. Further, an individual gain value may exist for each force sensor electrode for the same temperature. The temperature to gain mapping (308) may be a logical table or a function.

In one or more embodiments, the temperature to gain mapping (308) is generated for the input devices of the same type. For example, input devices being of the same vendor and model, having the same hardware configurations, have force sensor electrodes that similarly respond to an increase or decrease in temperature. In such an example, the temperature to gain mapping (308) may be generated and stored for each input device of the same type. Generating the temperature to gain mapping (308) may be performed through experimentation. For example, an input object may be placed on a position of the input surface while capacitive measurements are acquired using the force sensor electrodes under different temperature conditions. Regression or other analysis may be performed to determine the gain that should be applied for each temperature such that revised capacitive measurements (i.e., capacitive measurements with the gain applied) when the input object is at the same position is the same within a margin of error regardless of temperature. The determined temperature to gain mapping may be stored in each input device of the same type. In some embodiments, each input device regardless of type, may have the same temperature to gain mapping. In such a scenario, the temperature to gain mapping may be stored in each input device without further experimentation.

In some embodiments, the capacitive measurement to temperature mapping may be the same across input devices of the same type. In some embodiments, the capacitive measurement to temperature mapping is only the same across a manufacturing run of the type of input device. In some embodiments, calibration is performed to generate the capacitive measurement to temperature mapping, such as during the manufacturing stage. In other embodiments, generating the capacitive measurement to temperature mapping is performed at any time in which an external temperature measurement may be obtained and an input object is not present in the sensing region.

Figure 4:
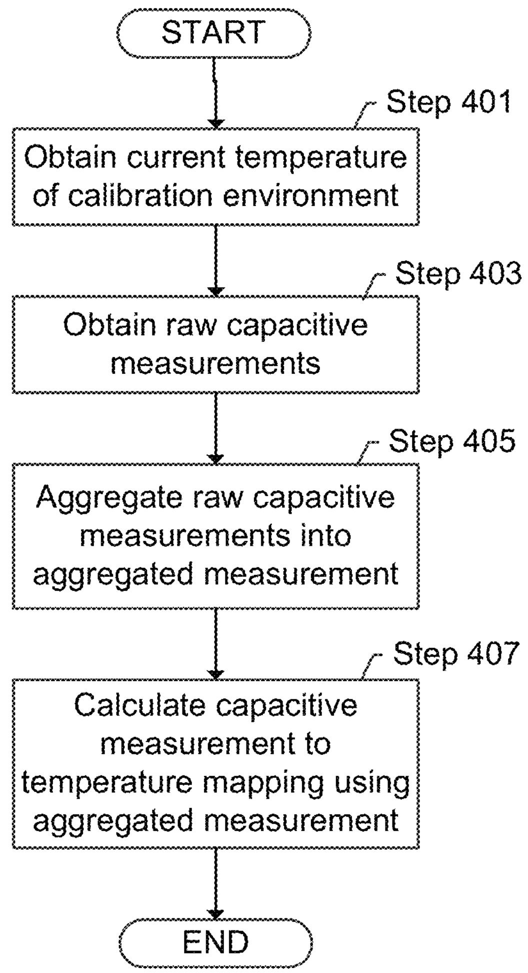
FIGS. 4 and 5 show flowcharts in accordance with one or more embodiments of the invention.

FIG. 4 shows a flowchart for generating a capacitive measurement to temperature mapping as part of calibration. In Step 401, a current temperature of the calibration environment is obtained. The current temperature may be obtained from an external temperature sensor. The external temperature sensor is a dedicated piece of equipment for measuring temperature. For example, the external temperature sensor may be a temperature probe, a separate component of the input device, a temperature sensor in a thermostat, or another temperature sensor. Obtaining the current temperature from the external temperature sensor is performed directly (e.g., acquiring a signal from the temperature sensor) or indirectly (e.g., receiving input of the temperature acquired from the temperature sensor via another party).

In Step 403, raw capacitive measurements are obtained from the force sensor electrodes. In one or more embodiments, the raw capacitive measurements are from absolute and/or mutual capacitive measurements of the force sensor electrodes. Absolute capacitance is determined by determining the amount of electric charge added to a force sensor electrode to increase the electric potential of the force sensor electrode by one unit. To determine the absolute capacitance, the force sensor electrodes are driven with a modulated sensing signal to determine the amount of electric charge. Measurements at each force sensor electrode are obtained. For example, the measurements may be obtained at once or at different times. Mutual capacitance measurements may be obtained by transmitting a transmitter signal with a transmitter electrode (e.g., a force sensor electrode). Resulting signals are received using another force sensor electrode, which is the receiver electrode. In one or more embodiments of the invention, the resulting signals are affected by the distance between the transmitter electrode and receiver electrode and, subsequently, the compression of the compressible layer as affected by force. Measurements of the resulting signals are obtained.

In Step 405, raw capacitive measurements are aggregated into an aggregated measurement in accordance with one or more embodiments of the invention. The aggregation is performed with a combined capacitive measurement to temperature mapping exists for the collection of force sensor electrodes. For example, the aggregation may be to average the raw capacitive measurements. The average may be a direct average or a weighted average. By way of a more specific example, the weights may be based on the bending properties of the input surface.

In Step 407, capacitive measurement to temperature mapping is calculated using the aggregated measurement in accordance with one or more embodiments of the invention. For example, the capacitive measurement to temperature mapping may be approximated as a linear function. The slope of the linear function may be consistent across the input devices and may be determined through experimentation. The current temperature obtained in Step 401 is equated to zero or the baseline value for the y-intercept. The aggregated measurement is the y-intercept (e.g., (aggregated measurement, 0)). In equation form, function may be of the form $f(t)=m*t+b$, where m is the slope of the linear function that is a constant across input devices and determined through experimentation, b is the aggregated measurement, t is temperature, and f(t) is the capacitive measurement. In one or more embodiments of the invention, the slope, y-intercept, and room temperature stored in the data repository.

By way of another example, the capacitive measurement to temperature mapping may be performed by generating a table of an aggregated measurement generated in Step 406 under various current temperatures obtained in Step 401. In such a scenario, the various aggregated measurements and corresponding temperatures are stored.

Figure 5:
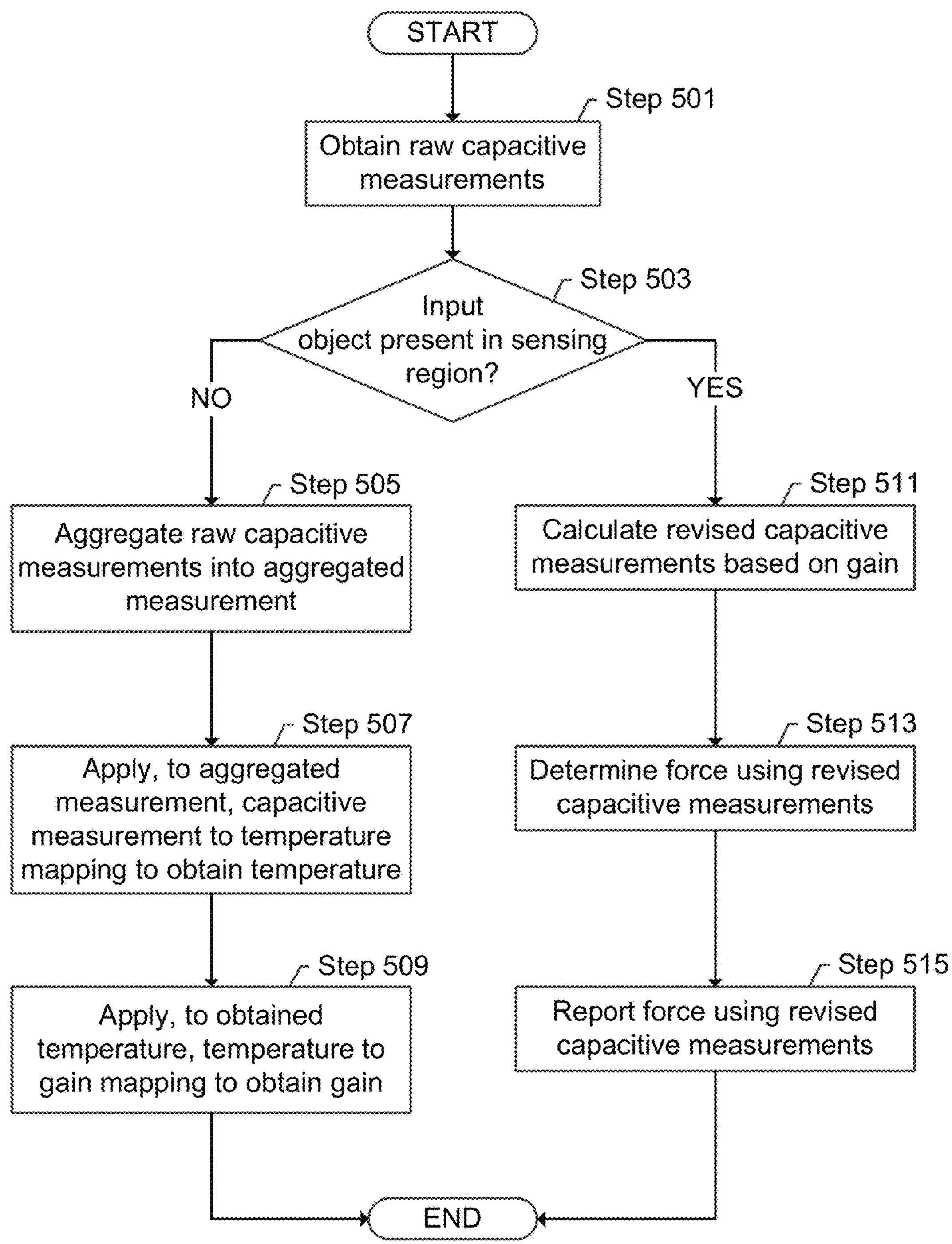

FIG. 5 shows a flowchart for using the capacitive measurement to temperature mapping and the temperature to gain mapping in accordance with one or more embodiments of the invention. In general, in FIG. 5, when an input object is not present, a current temperature is determined using the force sensor electrodes. When an input object is present, the current temperature previously determined is used to apply gain to the measurements and obtain a more accurate determination of force.

In Step 501, raw capacitive measurements are obtained from the force sensor electrodes in accordance with one or more embodiments of the invention. Obtaining raw capacitive measurements may be obtained in a same or similar manner as discussed above with reference to Step 403 of FIG. 4. In one or more embodiments, the raw capacitive measurements are obtained during use of the input device.

In Step 503, a determination is made whether an input object is present in the sensing region in accordance with one or more embodiments of the invention. Because the presence of an input object may affect the capacitive measurements obtained using force sensor electrodes, the presence of the input object may cause an incorrect temperature approximation. Determining the presence may be based on whether a portion of the capacitive measurements satisfies a detection threshold. The presence may be determined based on the shape of the capacitive measurements. For example, capacitive measurements ordered based on location and having a steep peak value may be indicative of the presence of an input object. If an input object is determined not to be present in the sensing region, the flow may proceed to Step 505.

In Step 505, the raw capacitive measurements are aggregated into an aggregated measurement. Aggregating the raw capacitive measurements may be performed as discussed above with reference to Step 405.

In Step 507, the capacitive measurement to temperature mapping is applied to the aggregated measurement. If the capacitive measurement to temperature mapping is a table, then applying the capacitive measurement to temperature mapping may be performed by querying the table with the aggregated measurement. If the capacitive measurement to temperature mapping is a function, then the function may be calculated using the aggregated measurement as input. The result of the function is a current temperature. If the current temperature is relative, the current temperature may be adjusted with the calibrated stored temperature to obtain an actual current temperature. For example, the adjusting may be to add the temperature obtained in Step 401 to the relative current temperature to obtain the actual current temperature.

In Step 509, a temperature to gain mapping is applied to the obtained temperature in Step 507 to obtain the gain. For example, if the temperature to gain mapping is a table, a lookup may be performed in the table to identify the corresponding temperature. If the current temperature is between two temperature values in the table, the gain may be determined by interpolation. For example, consider the scenario in which the table has a first temperature value of 65 matching gain of 5 and a second temperature value of 75 matching a gain of 10. If the current temperature is 73, then the gain may be calculated from the values in the table as 9 (e.g., ((10−5)*(73−65)/(75−65))+5). Other techniques for calculating gain that do not use linear interpolation may be used without departing from the scope of the invention.

The flow may proceed to end for the current frame of capacitive sensing. FIG. 5 may be continually repeated during usage for each frame of capacitive sensing. Thus, if an input object is present during a current frame, then a temperature determined during the previous frame may be used to generate revised capacitive measurements. Thus, for a subsequent frame of capacitive sensing in which raw capacitive measurements are obtained in Step 501 and an input object is detected as being present in Step 503, the flow may proceed to Step 511.

In Step 511, revised capacitive measurements are calculated based on gain. Each capacitive measurement is revised individually according to the gain determined in Step 509. Thus, if the gain is an additive gain, then the gain is added individually to each capacitive measurement. In other words, for each force sensor electrode, the revised capacitive measurement for the force sensor electrode is equal to the raw capacitive measurement plus the gain. If the gain is a multiplicative gain, then each capacitive measurement is multiplied by the gain. In other words, for each force sensor electrode, the revised capacitive measurement for the force sensor electrode is equal to the raw capacitive measurement times the gain.

In Step 513, the force is determined using the revised capacitive measurements in accordance with one or more embodiments of the invention. The application of the gain acts to normalize the raw capacitive measurements obtained from the force sensor electrodes for temperature. Thus, the revised capacitive measurements are the measurements that would exist if the input device were in the calibration environment. Further processing may be performed to account for background noise, and to remove erroneous data. If the capacitive force measurements also include positional information (e.g., a force image is combined with the touch image because an overlapping subset of sensor electrodes are used for both force and touch), processing may be performed to extract the force measurements.

Various techniques may be performed in order to determine force. For example, the weights may be applied to each of the force measurements to account for the bending properties of the input surface and the display. In other words, some force sensor electrodes may have a lower capacitive response than other force sensor electrodes because of the variability in the bending properties. Weights may be applied to the force sensor electrodes to accommodate the variability. The weighted force measurements may be combined into a combined measurement. Further, a correction factor may be applied to the combined measurement and a transformation may be applied to transform the combined measurement into a force value indicative of force. Force may be determined on a per input object basis, for a single input object, or for multiple input objects combined. Other techniques for determining force may be used without departing from the scope of the invention.

In Step 515, the force is reported using the revised capacitive measurements. In one or more embodiments of the invention, the force may be reported to a central processor of the input device. The central processor may use the force as user input requesting an action to be performed by the input device. For example, the input may be to select an item in the graphical user interface, open or close an application, provide further information, or performed another action.

Although FIG. 5 shows obtaining the gain during the same frame as the current temperature is obtained, the gain may be obtained after the subsequent frame in which capacitive measurements indicating the presence of an input object are obtained.

Because the processing system may not have access to actual temperature sensor on the input device and/or the temperature sensor on the input device may not reflect the temperature of the force sensor electrodes (e.g., due to hotspots on the input device), one or more embodiments create a technique for determining the temperature. In particular, as shown above, one or more embodiments provide a technique for the processing system to determine the current temperature of the force sensor electrodes using capacitive measurements from the force sensor electrodes. The current temperature may then be used to adjust the capacitive force measurements when force is applied to the input surface. Thus, one or more embodiments provide a more accurate detection of force.

Figure 6:
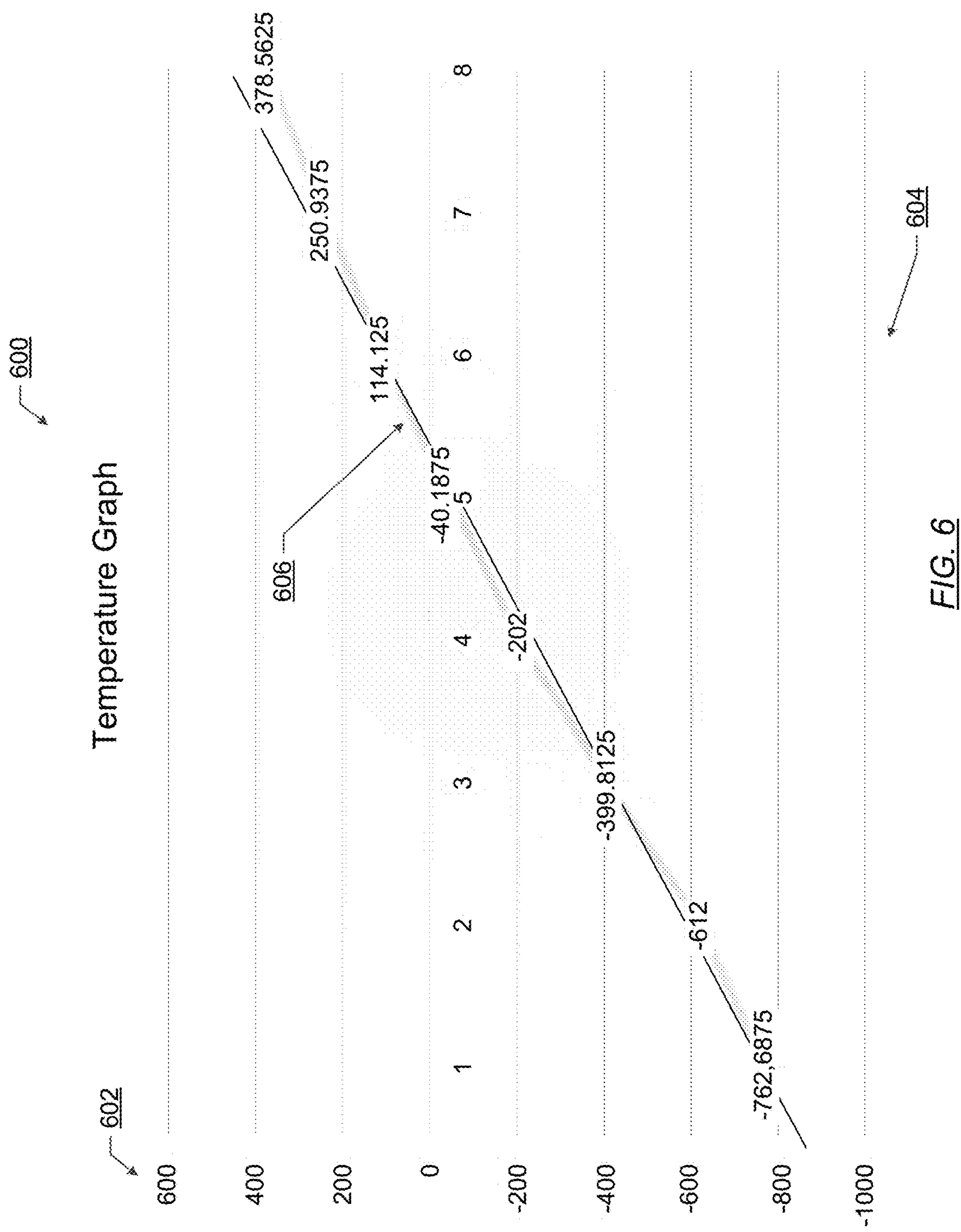
FIG. 6 shows an example in accordance with one or more embodiments of the invention.

FIG. 6 shows an example temperature graph (600) in accordance with one or more embodiments of the invention. The vertical axis (602) is for the change in the aggregated value of the capacitive measurements in femtoFerads and the horizontal axis (604) is for temperature increases over the calibration temperature scaled at 10 degrees Celsius per interval. As shown in FIG. 6, as the temperature increases, the same change in capacitive measurements has approximately a linear increase as well.

Using the example of FIG. 6, consider the scenario in which the capacitive measurement to temperature mapping is the line (606) of FIG. 6. The line may be determined, for example, using the technique described above with reference to FIG. 4 or may be a line of best fit once the input object is placed under different temperature variations. Continuing with the example, during use of the input device, raw capacitive measurements from the force sensors are obtained. Based on the raw capacitive measurements or measurements from touch sensor electrodes, an input object is determined to not be present in the sensing region. Accordingly, the processing system determines a current temperature of the sensing region. Determining the current temperature includes aggregating the raw capacitive measurements to have an aggregated value of −612 femtoFerads. In such an example, the current temperature is determined to be 20 degrees Celsius over the temperature when the during calibration from the temperature graph shown in FIG. 6. The corresponding gain for the 20 degree increase is determined from a temperature to gain mapping. When an input object is determined to be present and to be applying force to the input surface in a subsequent frame of sensing, the gain is added to each of the raw capacitive measurements of the force sensors to obtain the revised capacitive measurements. Thus, the revised capacitive measurements account for the temperature variation of the force sensor electrodes from calibration and are more reflective of the force applied. As shown, one or more embodiments provide a more accurate technique for determining force applied to the input surface by determining temperature from the capacitive measurements and accounting for the changing temperature of the force sensor electrodes.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system, comprising:
sensor circuitry configured to be coupled to a plurality of force sensor electrodes, the sensor circuitry configured to drive the plurality of force sensor electrodes to obtain a first plurality of capacitive measurements; and
processing circuitry operatively connected to the sensor circuitry and configured to:
aggregate the first plurality of capacitive measurements into an aggregated measurement, and
apply, to the aggregated measurement, a capacitive measurement to temperature mapping to obtain a current temperature of the plurality of force sensor electrodes.

2. The processing system of claim 1, wherein the processing circuitry is further configured to:
determine an absence of an input object in the sensing region, wherein obtaining the current temperature of the plurality of force sensor electrodes is in response to determining the absence of the input object, and
store the current temperature to obtain a stored temperature.

3. The processing system of claim 2, wherein the sensor circuitry is further configured to:
drive the plurality of sensor electrodes to obtain a second plurality of capacitive measurements;
wherein the processing circuitry is further configured to:
determine a presence of an input object in the sensing region,
apply, in response to determining the presence of the input object, a temperature to gain mapping to the stored temperature to obtain a gain, and
apply the gain to the second plurality of capacitive measurements to obtain a plurality of revised capacitive measurements.

4. The processing system of claim 3, wherein the processing circuitry is further configured to:
determine a force on an input surface using the plurality of revised capacitive measurements; and
report the force.

5. The processing system of claim 1, wherein aggregating the first plurality of capacitive measurements comprises averaging the first plurality of capacitive measurements.

6. The processing system of claim 1, wherein the capacitive measurement to temperature mapping comprises a linear function.

7. The processing system of claim 1, wherein the linear function uses a temperature of a test environment as an intercept.

8. The processing system of claim 1, wherein the sensor circuitry is further configured to:
drive, in the test environment, the plurality of sensor electrodes to obtain a second plurality of capacitive measurements,
wherein the processing circuitry is further configured to:
obtain a test environment temperature of a test environment,
aggregate the second plurality of capacitive measurements to obtain a test capacitive measurement, and
save the test capacitive measurement and the test environment temperature in memory as the capacitive measurement to temperature mapping.

9. A method, comprising:
driving a plurality of force sensor electrodes to obtain a first plurality of capacitive measurements;
aggregating the first plurality of capacitive measurements into an aggregated measurement; and
applying, to the aggregated measurement, a capacitive measurement to temperature mapping to obtain a current temperature of the plurality of force sensor electrodes.

10. The method of claim 9, further comprising:
determining an absence of an input object in the sensing region, wherein obtaining the current temperature of the plurality of force sensor electrodes is in response to determining the absence of the input object; and
storing the current temperature to obtain a stored temperature.

11. The method of claim 10, further comprising:
driving the plurality of sensor electrodes to obtain a second plurality of capacitive measurements;
determining a presence of an input object in the sensing region;
applying, in response to determining the presence of the input object, a temperature to gain mapping to the stored temperature to obtain a gain; and
applying the gain to the second plurality of capacitive measurements to obtain a plurality of revised capacitive measurements.

12. The method of claim 11, further comprising:
determining a force on an input surface using the plurality of revised capacitive measurements; and reporting the force.

13. The method of claim 9, wherein aggregating the first plurality of capacitive measurements comprises averaging the first plurality of capacitive measurements.

14. The method of claim 9, wherein the capacitive measurement to temperature mapping comprises a linear function.

15. The method of claim 9, wherein the linear function uses a temperature of a test environment as an intercept.

16. The method of claim 9, further comprising:
driving, in a test environment, the plurality of sensor electrodes to obtain a second plurality of capacitive measurements;
obtaining a test environment temperature of a test environment;
aggregating the second plurality of capacitive measurements to obtain a test capacitive measurement; and
saving the test capacitive measurement and the test environment temperature in memory as the capacitive measurement to temperature mapping.

17. An input device comprising:
a plurality of sensor electrodes configured to generate sensing signals; and
a processing system connected to the plurality of sensor electrodes and configured to:

drive the plurality of force sensor electrodes to obtain a first plurality of capacitive measurements, aggregate the first plurality of capacitive measurements into an aggregated measurement, and apply, to the aggregated measurement, a capacitive measurement to temperature mapping to obtain a current temperature of the plurality of force sensor electrodes.

18. The input device of claim 17, wherein the processing system is further configured to:

determine an absence of an input object in the sensing region, wherein obtaining the current temperature of the plurality of force sensor electrodes is in response to determining the absence of the input object, and store the current temperature to obtain a stored temperature.

19. The input device of claim 18, wherein the processing system is further configured to:

drive the plurality of sensor electrodes to obtain a second plurality of capacitive measurements, determine a presence of an input object in the sensing region, apply, in response to determining the presence of the input object, a temperature to gain mapping to the stored temperature to obtain a gain, and apply the gain to the second plurality of capacitive measurements to obtain a plurality of revised capacitive measurements.

20. The input device of claim 19, wherein the processing system is further configured to:

determine a force on an input surface using the plurality of revised capacitive measurements, and report the force.

* * * * *